(12) United States Patent
Griffin

(10) Patent No.: US 10,347,118 B2
(45) Date of Patent: Jul. 9, 2019

(54) DEVICE AND METHOD FOR CONTROLLING A PLURALITY OF TARGETED DEVICES

(71) Applicant: Griffin Innovation, Kitchener (CA)

(72) Inventor: Jason Griffin, Kitchener (CA)

(73) Assignee: Griffin Innovation, Kitchener, Ontario (CA)

( * ) Notice: Subject to any disclaimer, the term of this patent is extended or adjusted under 35 U.S.C. 154(b) by 0 days.

(21) Appl. No.: 15/579,508

(22) PCT Filed: Jun. 2, 2016

(86) PCT No.: PCT/CA2016/050624
§ 371 (c)(1),
(2) Date: Dec. 4, 2017

(87) PCT Pub. No.: WO2016/191875
PCT Pub. Date: Dec. 8, 2016

(65) Prior Publication Data
US 2018/0151060 A1    May 31, 2018

Related U.S. Application Data

(60) Provisional application No. 62/171,076, filed on Jun. 4, 2015.

(51) Int. Cl.
H04N 5/44 (2011.01)
G01S 13/46 (2006.01)
(Continued)

(52) U.S. Cl.
CPC ............. *G08C 17/00* (2013.01); *G06F 16/29* (2019.01); *G08C 17/02* (2013.01); *G08C 23/04* (2013.01);
(Continued)

(58) Field of Classification Search
CPC ............... G08C 17/00; G08C 2201/91; G08C 2201/92; G08C 19/00; G08C 23/04;
(Continued)

(56) References Cited

U.S. PATENT DOCUMENTS 7,363,028 B2 * 4/2008 de Clerq ................ G05B 15/02
455/414.1
9,237,383 B2 * 1/2016 Negroponte ......... G06K 9/3266
(Continued)

*Primary Examiner* — Mirza F Alam
(74) *Attorney, Agent, or Firm* — Woods Oviatt Gilman LLP; Dennis B. Danella, Esq.

(57) ABSTRACT

A control device and method for controlling a plurality of targeted devices. The control device includes orientation and direction sensors for measuring orientation and direction of the control device relative to the environment, a device location tracking system for determining the location of the control device relative to at least one reference device, a database for storing location data of spatial targets for the target devices, a processor for determining if the control device is pointed at the spatial target based on the location data of the spatial target and the orientation, direction, and location of the control device, and an input mechanism for receiving control instructions for controlling the targeted device.

14 Claims, 5 Drawing Sheets

(51) Int. Cl.
  *G08C 17/00* (2006.01)
  *G06F 16/29* (2019.01)
  *G08C 17/02* (2006.01)
  *G08C 23/04* (2006.01)
  *H04N 21/41* (2011.01)
  *H04N 21/414* (2011.01)

(52) U.S. Cl.
  CPC ......... *H04N 5/4403* (2013.01); *H04N 21/414* (2013.01); *H04N 21/4126* (2013.01); *G01S 13/46* (2013.01); *G01S 2013/468* (2013.01); *G08C 2201/32* (2013.01); *G08C 2201/91* (2013.01); *G08C 2201/92* (2013.01); *H04N 2005/4428* (2013.01); *H04N 2005/4432* (2013.01)

(58) Field of Classification Search
  CPC ............... G06F 17/30241; G01S 13/46; G01S 2013/468; G05B 15/02; H04N 5/4403
  USPC ........................................ 340/12.52; 370/338
  See application file for complete search history.

(56) References Cited

U.S. PATENT DOCUMENTS

| | | | | |
|---|---|---|---|---|
| 2002/0072356 A1* | 6/2002 | Yamashita | ........ | H04M 1/72533 455/420 |
| 2005/0094610 A1* | 5/2005 | de Clerq | ................ | G05B 15/02 370/338 |
| 2016/0098920 A1* | 4/2016 | Ferren | .................. | G06K 9/3266 340/12.5 |

\* cited by examiner

DEVICE AND METHOD FOR CONTROLLING A PLURALITY OF TARGETED DEVICES

TECHNICAL FIELD

The embodiments disclosed herein relate to mobile devices, and, in particular to systems, apparatuses, and methods for controlling a plurality of targeted devices.

INTRODUCTION

In consumer electronics, a remote control is a component of an electronic device such as a television set, DVD player, or other home appliance, used to operate the device wirelessly from a short distance. Remote control is a convenience feature for the consumer, and can allow operation of devices that are out of convenient reach for direct operation of controls.

Commonly, remote controls are infrared devices which send digitally-coded pulses of infrared radiation to control functions such as power, volume, tuning, temperature set point, fan speed, or other features. Remote controls for these devices are usually small wireless handheld objects with an array of buttons for adjusting various settings such as television channel track number, and volume. For many devices, the remote control contains all the function controls while the controlled device itself has only a handful of essential primary controls.

The remote control code, and thus the required remote control device, is usually specific to a product line, but there are universal remotes, which emulate the remote control made for most major brand devices. Remote control may also include Bluetooth connectivity, RF connectivity, motion sensor-enabled capabilities and voice control.

SUMMARY

According to some embodiments, there is a control device and method for controlling a plurality of targeted devices. The control device includes orientation and direction sensors for measuring orientation and direction of the control device relative to the environment, a device location tracking system for determining the location of the control device relative to at least one reference device, a database for storing location data of spatial targets for the target devices, a processor for determining if the control device is pointed at the spatial target based on the location data of the spatial target and the orientation, direction, and location of the control device, and an input mechanism for receiving control instructions for controlling the targeted device.

The direction sensor may be an accelerometer for measuring the direction of the control device in an up-down plane.

The orientation sensor may be a magnetometer for measuring the orientation of the control device in a North-East-South-West plane.

The orientation sensor may be an antenna array or a camera for determining the orientation of the control device relative to the reference device.

The reference device may include at least one camera configured to capture a tracking target displayed on the control device to determine the location of the control device.

The spatial target may be located on or near the targeted device and the control device may control the target device that is associated with the closest spatial target that the control device is pointed at.

The processor may include a setup process to create the spatial target for each target device. The spatial target may be determined from the intersection of at least two target lines or a point halfway between the shortest distance between the two target lines.

The spatial target may be determined from locating the control device at or near the desired spatial target location.

The spatial target may include a priority ranking to remove ambiguity as to what spatial target is being targeted. The priority ranking may be based on any one or more of proximity, user preselection, frequency of control of the targeted device, and recency of control of the targeted device.

The device location tracking system may determine the location of the control device by triangulating signals transmitted from at least three reference devices.

According to some embodiments, there is a method for controlling a plurality of targeted devices. The method includes measuring orientation and direction of a control device relative to the environment, determining the location of the control device relative to at least one reference device, storing location data of spatial targets for the target devices, determining if the control device is pointed at the spatial target based on the location data of the spatial target and the orientation, direction, and location of the control device, and receiving control instructions for controlling the targeted device.

The method may include measuring the direction of the control device relative to a horizontal plane.

The method may include measuring the orientation of the control device in the horizontal plane.

The method may include measuring orientation from two antenna arrays located at opposite ends of the control device.

The method may include capturing a tracking target displayed on the control device to determine the location of the control device.

The spatial target may be located on or near the targeted device and the control device may control the target device that is associated with the closest spatial target that the control device is pointed at.

The method may include a setup process including creating the spatial target for each target device. The spatial target may be determined from the intersection of at least two target lines or a point halfway between the shortest distance between the two target lines.

The method may include a setup process including creating the spatial target for each target device. The spatial target may be determined from locating the control device at or near the desired spatial target location.

The method may include performing a priority ranking to remove ambiguity as to what spatial target is being targeted. The priority ranking may be based on any one or more of proximity, user preselection, frequency of control of the targeted device, and recency of control of the targeted device.

The method may include determining the location of the control device by triangulating signals transmitted from at least three reference devices.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 8 is a block diagram of a control device, in accordance with an embodiment.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below. It is possible that an apparatus or process described below is not covered by any of the claimed embodiments. Any embodiment disclosed below that is not claimed in this document may be the subject matter of another protective instrument, for example, a continuing patent application, and the applicants, inventors or owners do not intend to abandon, disclaim or dedicate to the public any such embodiment by its disclosure in this document.

Figure 1:
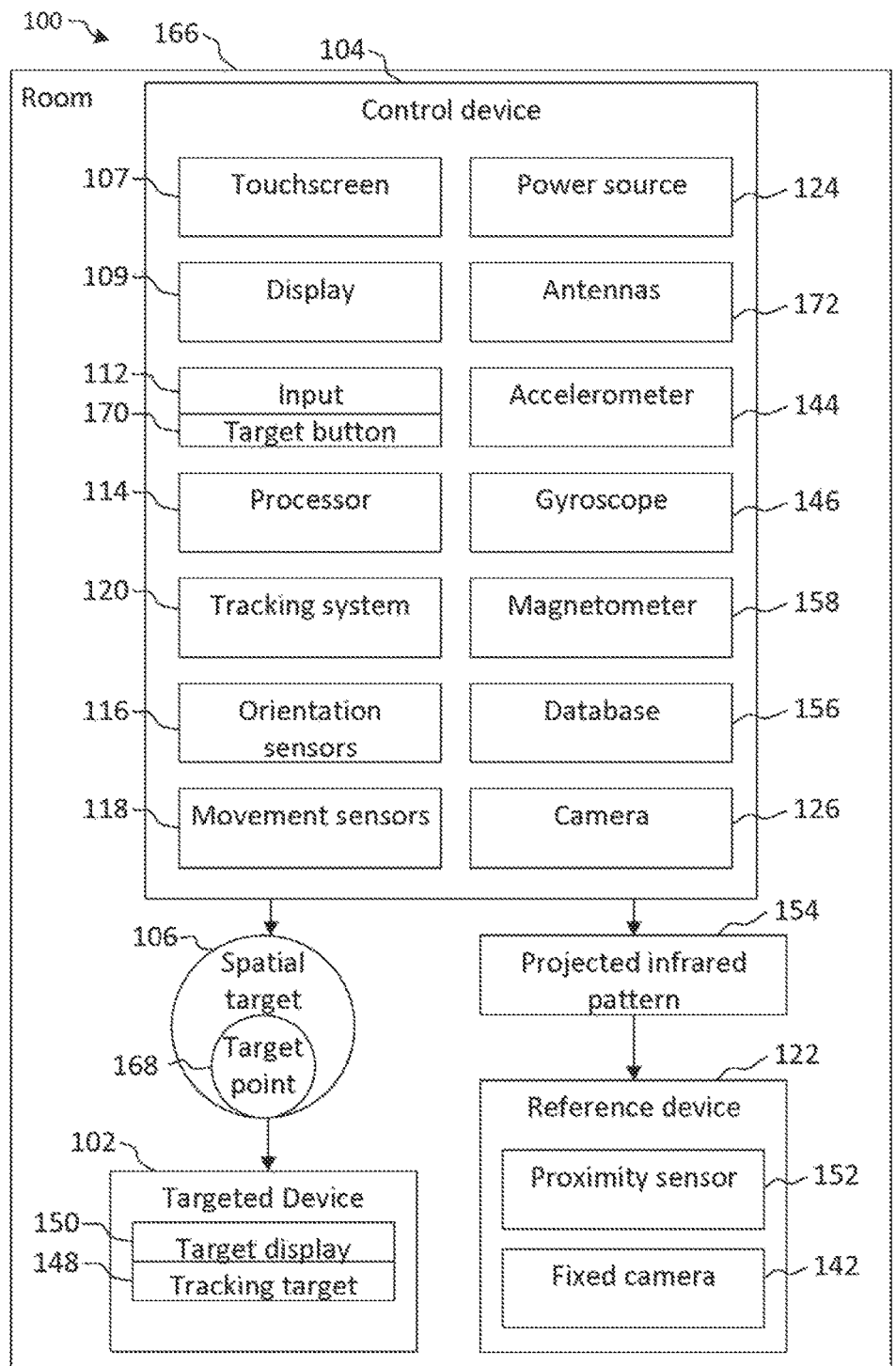
FIG. 1 is a flow diagram of a system for controlling a targeted device with a control device, in accordance with an embodiment.

Referring now to FIG. 1, illustrated therein is a system 100 for controlling at least one targeted device 102 with a control device 104, in accordance with an embodiment. The control device 104 identifies the targeted device 102 to control from the context and the orientation, direction, and location of the control device 104 relative to a spatial target 106. The spatial target 106 may be on the targeted device 102 that is intended to be controlled or it may be another location that the user references to control the targeted device. The control device 104 includes a database storing orientation, direction, and location data to establish where the control device 104 is pointing.

The location data describes the location and position of the control device 104 in the environment (e.g. room). For example, the location data may be determined from radio frequency triangulation from transmitters in several fixed reference devices 122.

The orientation data describes the orientation of the control device 104 in a horizontal plane, for example a North-East-South-West plane. The direction data describes the angle of the control device 104 from the horizontal plane, for example, an up-down plane. The orientation and direction data may be calculated from signals that are received, on one or more antenna arrays on the control device 104. In further embodiments, the orientation and direction data may be divided up to be measured by different sensors and technologies to simplify the implementation.

For example, an accelerometer 144 in the control device 104 provides the angle from horizontal for the control device 104, a magnetometer 158 provides the orientation of the control device 104 in the N-E-S-W plane, and radio frequency (RF) triangulation provides the location in the room, including the position and height off of the floor.

In a variant embodiment, having an overhead camera in a reference device capturing a barcode displayed on the touchscreen of the control device 104, a camera system may provide the positon with the height of the floor being a predetermined height (e.g. 1 meter off the floor), and the camera view of the barcode provide the orientation of the control device 104 in the horizontal plane (NESW). The accelerometer 144 may further be used to establish the angle from the horizontal plane (e.g., up-down plane) of the control device 104.

Figure 2:
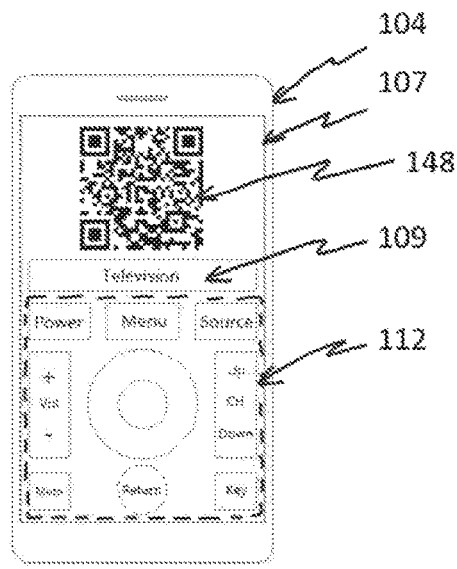
FIG. 2 is a front view of a control device such as a smartphone, in accordance with an embodiment.
Figure 3:
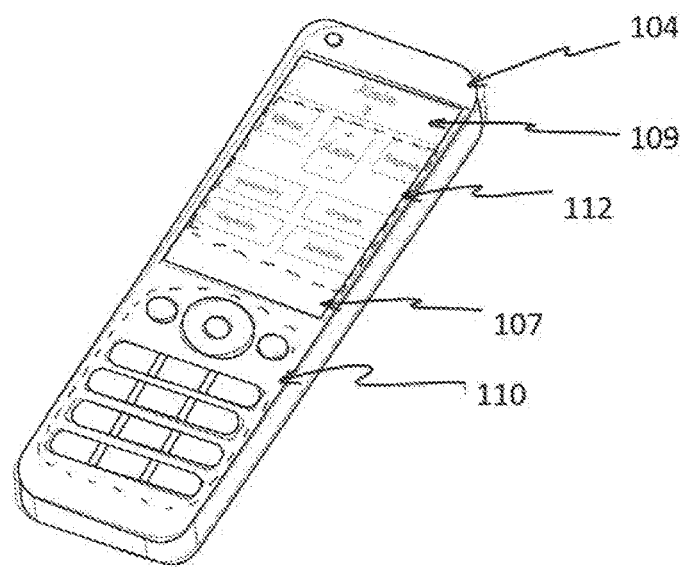
FIG. 3 is a perspective view of a control device such as a smartphone with fixed keys, in accordance with an embodiment.

In an embodiment, the control device 104 is a smartphone (FIGS. 2 and 3), a dedicated control device (FIG. 4), a smartwatch (FIG. 5), a tablet, a mobile computer or other types of devices that may have other functions in addition to controlling the targeted devices 102.

The control device 104 includes a processor 114, orientation sensors 116, and movement sensors 118. The processor 114 determines if the control device 104 is pointed at the spatial target 108 based on the location data of the spatial target 106 and the orientation, direction, and location of the control device 104.

The orientation and direction sensors 116, 118 measure orientation and direction of the control device 104 relative to the environment. The orientation and movement sensors 116, 118 may include any one or more of an accelerometer 144, a gyroscope 146 and a magnetometer 158.

The control device 104 also includes a database for storing location data of spatial targets 106 for the target devices 102.

The control device 104 includes an input mechanism 112 (such as a touchscreen and/or buttons) for receiving control instructions from a user for controlling the targeted device 102.

The control device 104 includes a power source 124 to power the elements of the control device 104. The power source 124 may be replaceable batteries or a rechargeable battery, as is known in the art. Where the elements are low power then the power source 124 is a battery.

The control device 104 includes a location tracking system 120 for measuring signals from the reference devices 122 that are located in the environment and in relatively close proximity (for example less than 100 feet) to the control device 104. The location tracking system 120 may include an antenna 172 or an antenna array. The location tracking system 120 may include a camera 126 or a camera array.

The device location tracking system 120 determines, with some accuracy, the position of the control device 104. The device location tracking system 120 locates the control device 104 within a room 168 or interior space. GPS systems may not be available or reliable indoors, accordingly, the device location tracking system 120 includes a local tracking system.

The device location tracking system 120 tracks the location of the control device 104 using a network of reference devices 122 that transmit an element signal 154. The reference devices 122 are in fixed locations in the room 166. The reference device 122 may be powered by and include a battery having a battery life of months or years as it may be inconvenient for a user to have to recharge the batteries in the reference devices 122 frequently.

In an embodiment, the reference device 122 is specifically designed for the system 100, for example where the reference device 122 includes RF triangulation, or an overhead camera. The reference device 122 for the location tracking system may also have a separate function such that it is also a target device 102. In this case, the reference device 122 is, for example, a light or a speaker.

In a variant embodiment, the reference device 122 may not be a purpose built device. For example for signal mapping and measuring, the signal strength of different signals is a way to map position. In an embodiment, the multiple cameras inside the control device 104 to track the position of the control device 104. In this case, the light emitting diodes (LEDs), stickers or other references that the cameras can track may be placed around the room. In a further example, the control device 104 tracks fixed physical elements already present (such as wall plugs and light switches) in the environment. In some cases, the reference devices 122 may have other functions (such as light bulbs, speakers, or a remote control docking base).

The antennas or antenna arrays 172 in the control device 104 measure data about the element signal 154, including any one of the angle at which the element signal 154 is coming from, the time or time difference it takes the element signal 154 to arrive at the control device 104, and the strength of the element signal 154. The control device 104 triangulates with one of the parameters (angle, time, signal strength) from at least three different sources.

The control device 104 may have a target marker 130 (e.g., shown at FIGS. 4 and 5) for indicating the direction that the control device 104 is to be pointed at the targeted device 102.

The location of the control device 104 is tracked through signal triangulation or through pattern recognition using the element signal 154 from different transmitters and the difference of the signals on different antennas. In an embodiment, the reference devices 122 are powered allowing the elements to transmit the element signal. For example, the reference device 122 is located at a fixed location such as an electrical outlets, a light socket, a light switch, a lamp, a dedicated object placed in the room 166, or integrated into other furniture or a targeted device 102.

The device location tracking system 120 may be a system 100 that combines several systems together. For example, the device location tracking system 120 includes any one or more of the reference device 122, a global position system (GPS), a magnetic positioning system, and/or a dead reckoning system. A combination of several systems may improve the location and/or orientation accuracy.

The location tracking system 120 may allow the control device 104 to be accurately tracked in space. The location tracking system 120 may be a tracking system that is relative in nature and may not create accurate tracking in space, meaning the tracking may be distorted. Where the location tracking system 120 does not create an accurate view in space, the location tracking system 120 may still work effectively because a relative mapping in space provides a desired level of control. The location tracking system 120 may be selected from the following non-exclusive list: radio waves, acoustic waves, magnetic field sensing, optical, infrared, and ultrasound. Some of the technologies may be better suited for direction tracking and others for proximity tracking.

In an embodiment, the system 120 includes one or more reference devices 122 to track the control device 104 and then wirelessly communicate the location, or location and orientation to the control device 104.

The targeted device 102 having a target display 150 may display a tracking target 148. In an alternative, the display 109 of the control device 104 displays the tracking target 148. The tracking target 148 may dynamically update to allow the tracking target 148 to be overlaid with user interface elements to improve tracking accuracy. The overlaid tracking target 148 allows a larger area of the touchscreen 109 to be used for tracking while that same area is used for the user interface. The tracking target 148 may appear and disappear quickly so that it is not visible to the user.

In an embodiment, the tracking target 148 may include a fixed image. For example, the tracking target 148 may be a 2D barcode used for tracking.

The tracking target 148 displayed on the reference device 122 may include a description of what control device 104 is being used, where there are more than one configured control devices 104 configured to work with the system 100. In this embodiment, the control device 104 may be a smartphone, multiple smartphones, or a combination of multiple smartphones and control devices 104.

Where the tracking target 148 is being displayed on the display 109 of the control device 104, the reference device 122 is located above a common usage space of the control device 104. For example, the reference device 122 is located in light fixtures, tall floor lamps, or tall towers dedicated for housing the reference devices 122. In this embodiment, the reference device 122 tracks the location and orientation in the NESW (North, East, South, West) plane. The accelerometer 144 within the control device 104 tracks the orientation of the control device 104 in the up/down plane.

The reference device 122 may include a distance or proximity sensor 152 for tracking the location of the control device 104 using the camera 126. In certain cases, the control device 104 assumes a predetermined height of the control device 104 from the floor. The proximity sensor 152 helps in locating the control device 104 when combined with the optical tracking of the target from the camera. The distance of proximity sensor 152 may be similar to the sensors used in the Microsoft's Kinect™ system.

The distance or proximity sensor 152 may include an infrared projector and a fixed camera 142. The camera 128 of the control device 102 projects an infrared pattern 155 which is received by the fixed camera 142. The fixed camera 142 determines the distance at different points of view by measuring the distortion of the infrared pattern 155.

Where the view from one reference device 122 of the tracking target 148 is obscured or where the tracking target 148 is perpendicular to one of the reference devices 122, the system 100 includes at least two reference devices 122. Where the tracking target 148 has been obscured, other sensors in the control device 104 such as the magnetometer 158, the gyroscope 146, and/or the accelerometer 144 may track the movement of the control device 104.

The processing of the location and orientation may be shared between the reference device 122 and the control device 104. The processing of what spatial target 106 the control device 104 is pointing towards is executed on the control device 104 or in the reference device 122.

The control device 104 activates the context of what targeted device 102 to control based on the spatial target 106 that the control device 104 is being pointed towards. To control the targeted device 102, the control device 104 communicates with the targeted device 102. For example, the control device 104 communicates with the targeted device 102 through wireless communications for example Wi-Fi, Zigbee, Bluetooth, infrared, Z-wave, and wireless x10.

An alternate embodiment, the reference device 122 acts as an interfacing control element to communicate the commands to the targeted devices 102.

Figure 4:
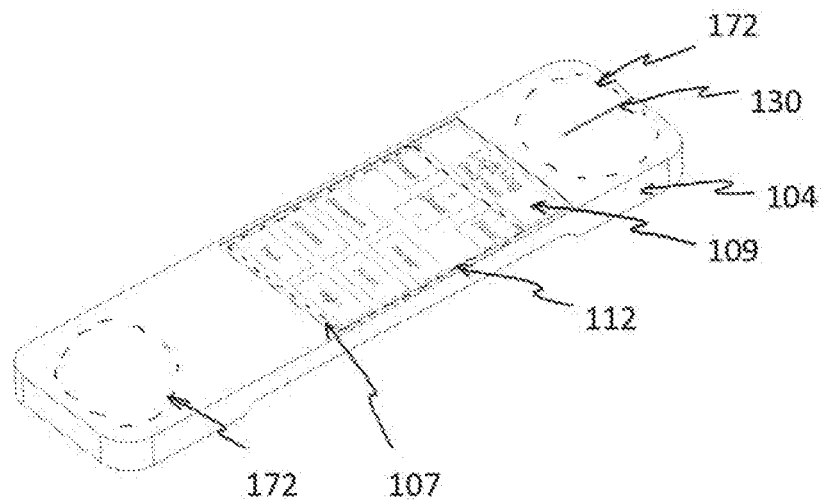
FIG. 4 is a perspective view of a control device such as a dedicated control device, in accordance with an embodiment.
Figure 5:
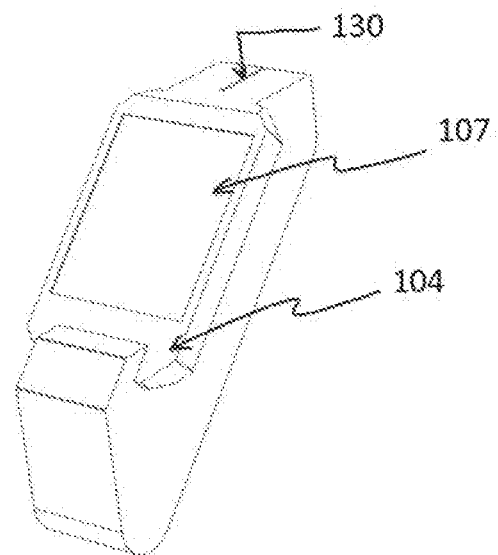
FIG. 5 is a perspective view of a control device such as a watch, in accordance with an embodiment.

Turning now to FIG. 4, illustrated therein is an embodiment of the control device 104, in accordance with an embodiment. The control device 104 is shaped to facilitate pointing towards the spatial target 106. For example, the shape might be similar to that of a common TV remote control that the user may be comfortable with using. The control device 104 may be predominately cylindrical (e.g., a flashlight shape). The control device 104 may have a pistol shape that has a display 109 that is close to perpendicular when the control device 104 is pointed at a target to allow the user to see the controls and input control instructions.

For user comfort, the control device 104 may have a form factor longer than it physically needs to be. The control device 104 may have a control layout that allows for more separation between receiver antennas or receiver antenna arrays. Comparing the signals at different antennas or different antenna arrays may be an integral part of the location and orientation tracking system 120. The location tracking system 120 may have the cameras 126 or camera arrays placed in a location on the control device 104 positioned such that the tracking system 120 is not obscured by a grip of the user.

The control device 104 has a primary surface 110 that contains an input mechanism 112 for receiving control instructions from a user for controlling the targeted device 102. The input mechanism 112 may include any one or more of buttons, touchscreen 107 (as shown), touch sensitive controls, voice commands or a combination thereof.

Figure 6:
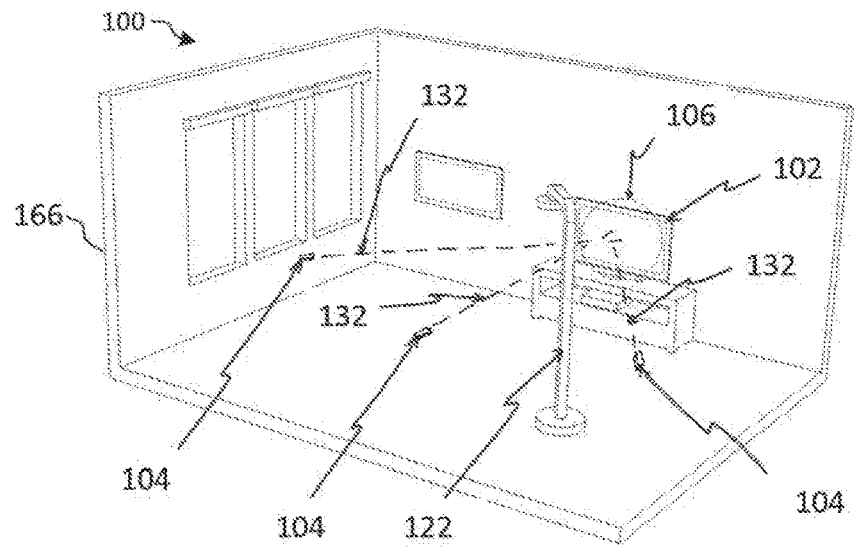

Turning now to FIG. 6, illustrated therein is an example system 100 for controlling at least one targeted device 102 with a control device 104, in accordance with an embodiment. FIG. 6 illustrates the setup learning mode of the targeted device 102. The processor includes a setup process to create the spatial target for each target device 102. The control device 104 adds the targeted device 102 through a learning mode to associate the targeted device 102 with the spatial target 106.

The targeted device 102 includes, for example, home automation devices or electronic devices. The targeted devices 102 that are controlled by the control device 104 may be relatively simple and part of a standard profile. The targeted device 102 may be an advanced system where the control configuration or a reference to the targeted device 102 is retrieved from the targeted device 102 that is intended to be controlled.

The learning mode includes a configuration program stored in a database 156 and a reference code. The configuration program may include a command learning mode for associating the targeted device 102 with the spatial target 106. Certain configurations and learning systems are known and may be part of the configuration process or setup of the targeted device 102 with the control device 104.

The setup learning mode includes a spatial learning mode for associating the targeted device 102 or group of targeted devices 102 to be controlled with the spatial target 106.

The spatial target 106 is a point or volume in space where the control device 104 is pointed at to give the control device 104 context of what targeted device 102 is to be controlled. The spatial target 108 may be a sphere in space. The spatial target 108 has a size that may be different based on different parameters, including, for example, a proximity to other spatial targets 106, direction the control signals come in from, consistency of targeting, or a user adjustment. The configuration of the spatial target 108 may adjust over time as the spatial target 106 may be used based on parameters like averaging offsets to its center point as it is used.

To initially create the spatial target 106, the user may be prompted to point the control device 104 at the targeted device 102 from different positions a minimum of two locations in the room 166 to create target lines and a target point 168. The target point 168 may be determined from where the target lines intersect from the user pointing the remote or the point halfway between the shortest distance between the two target lines. The target point 168 may be determined by taking tolerance errors into account. The learning mode may prompt the user to point the control device 104 at the targeted device 102 from a plurality of different locations to improve the accuracy of the position of the spatial target 106.

In an embodiment, to define the spatial target 106, the control device 104 is placed near or at the desired spatial target 106 location. This may have some practical limits, where the control device 104 can be tracked or where a user can safely and easily bring the handheld remote control. For example the desired spatial target 106 for the lights in the room 166 might be the middle of a tall ceiling and it would be difficult for the user to hold the control device 104 on the ceiling.

When several spatial targets 106 exist for control there may be ambiguous situations created depending on where the control device 104 is being pointed from. For example, the target path from the direction the control device 104 is pointed in may pass through multiple spatial targets 106.

In order to remove ambiguity, the control device 104 may assume that the closest spatial target 106 is associated with the target device 102 to control. Where the user wants to control another target device 102 may move the control device 104 to point at the target device 102 from a different position that is not ambiguous.

The control device 104 may include a priority ranking for control, so the control device 104 sets the context to control the targeted device 102 or group of targeted devices 102 with the highest priority. The priority ranking may be preselected by the user or by frequency where the targeted device 102 that is more commonly used is given the higher priority. The priority ranking may also be set by recency where the targeted device 102 that was most recently controlled is given the higher priority.

The target path that is most closely aligned to a center point of one of the spatial targets 106 may also be used to determine on which targeted device 102 has the higher priority. A more complex algorithm may be used that combines some or all of these possible disambiguation factors. Another embodiment may provide the user the option to select what targeted device 102 to control when there is an ambiguous situation or a default may be chosen with the user having the option to switch to the other targeted device 102 by activating the input mechanism 112 on the control device 104.

An alternate embodiment of the spatial target learning mode is where the 3D mapping and spatial targets 106 are built independently from the control device 104. A probabilistic system with a probabilistic threshold on whether an targeting line path is triggered controls a specific targeted device 102. This may allow the effective shape of a targeting threshold to change dynamically based on several characteristics such as signal quality, different locating tolerances in different planes, and the locating tolerance accuracy based on the position the control device 104 is located.

In an embodiment, the control device 104 is a touchscreen smartphone and the device location tracking system 120 includes a wide angle camera 126. The reference device 122 includes the proximity sensor 152 that extends over the common usage area for a user operating a remote control in the room 166.

Figure 7:
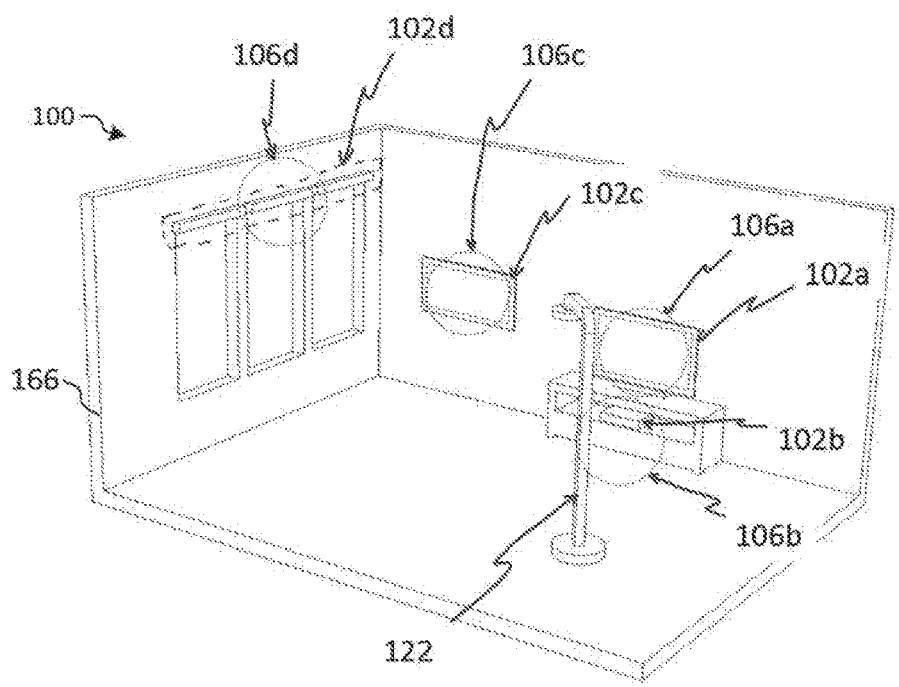
FIG. 7 is a perspective view of a system for controlling a plurality of targeted devices with a control device, in accordance with an embodiment.

Turning now to the embodiment shown in FIG. 7, the reference device 122 is a floor lamp. If the reference device 122 is moved, the fixed camera 142 and distance sensor in the reference device 122 tracks movement of position. By tracking its own shift, the reference device 122 compensates for being moved.

The user performs a setup of the control device 104 to control the television 102a, a cable box 102b, a fireplace 102c, and a grouping of window blinds 102d. The user downloads an application on the control device 104 that relates to the remote control system. The user selects the model number of the targeted devices 102 to be controlled from a search function within the application. The setup process on the targeted device 102 then prompts the user to setup the spatial target 106 for the television 102a. The user is prompted to aim the control device 104 at the television 102a and press a target button 170 on the control device 104.

The user is prompted to repeat the television targeted device 102a setup at least two more times from different positions in the room 166. A 2D barcode is displayed on the screen of the control device 104 during the setup process.

The fixed camera 142 in the reference device 122 processes the location and direction of the barcode in the NESW (north, east, south, west) plane relative to the fixed camera 142 orientation in the NESW plane. In this example, it may not be relevant to actually know what direction is North.

The distance sensor establishes the distance to the control device 104 from the distance sensor in the reference device 122. The height of the control device 104 off of the floor is determined based on subtracting the downward vector of the distance to the control device from the height off of the floor of the sensors in the reference device 122. The downward vector of the distance is calculated from the distance from the proximity sensor and the position of the control device 104 in the field of view of the camera sensor. The location, relative NESW orientation, and distance are sent to the control device 104. The control device 104 combines this information with up/down plane orientation information that is gathered from the accelerometer 144. When the user selects the target button 170 on the input mechanism 112, this information is used to create a target line established in 3D space relative to the location of the reference device 122. With 3 target lines established in the setup process for the television 102a, the control device 104 assigns the spatial target 106 and the target point 168 located as close as possible to the closest point of intersection of the 3 target lines. This process may be performed with two target lines but the third line will add accuracy to the intended target position.

While the television 102a is targeted by the control device 104, the position of the target center can be adjusted with targeting data that is acquired during use to further improve the accuracy of the spatial target 106 that is associated with the television 102a. In an embodiment, the spatial target 106 sphere is 3 feet in diameter by default, which may be adjusted through advanced settings in the application to increase or decrease the size of the spatial target 106.

The next step in the setup process is to setup the spatial target 106 for the cable box 102b. The setup process is the same for the cable box 102b however since the cable box 102b in this example is placed directly below the television 102a the user purposely targets the spatial target 106 a foot below the cable box 102b. In situations where the 3 foot diameter spheres intersect in 3D space, the control device 104 automatically adjusts the shape of the spatial target 106 by bisecting the portion of the spatial target that is defined by the circular plane of intersection.

The user continues the setup process by creating spatial targets 106 for the fireplace 102c and the group of window blinds 102d. During the setup of the spatial target 106 for the window blinds 102d, the user points the control device 104 in a direction where the 2D barcode cannot be viewed by the fixed camera 142 in the reference device 122.

To continue to track the position and orientation, the control device 104 uses dead reckoning by calculating the movement of the control device 104 with the gyroscope 146 and accelerometer 144 from a point where the position and orientation is known. The 3D mapping information is synced and stored locally on the reference device 122 and/or on the control device 104.

The 3D mapping information may be synced and stored in the inference device 122 so that another control device 104 can be paired to the system 100 without having to go through the setup process, as the already configured targeted devices 102 will already be there.

When the user opens the remote control application and the user points the control device 104 at the television 102a a title bar that says "Television" will show up on the application with virtual buttons below for controlling the television 102a. The control device 104 processes location and orientation by receiving the contextual data by Bluetooth communication with the reference device 122 to determine the relative position (including distance) and relative orientation (e.g., in the NESW plane).

Combining the position with the up/down plane orientation from the accelerometer 144, the control device 104 determines a target line in relative 3D space. The control device 104 compares this target line with the 3D mapping configuration to determine if the target line intersects the spatial target 106 of the television 102a. The control device 104 retrieves the control information from the database 156 and displays the control information on the touchscreen 107 of the control device 104. The user triggers the "on" button on the touchscreen 107. This command is communicated over Bluetooth to the reference device 122 which then transmits the proper signal by infrared to the television 102a. In this example, the television 102a and cable box 102b operate by receiving infrared commands and the fireplace 102c and the group of window blinds 102d operate by receiving commands by wireless x10 commands.

The control device 104 may operate the television 102a and cable box 102b together by using macro commands. Macro commands allow the control device 104 to operate both targeted devices 102 from the same spatial target 106. In this scenario the command to power on powers on both targeted devices 102a, 102b, where the volume only controls the television 102a and the ability to change channels controls the cable box 102b. While certain macro controls may be known in the industry, the macro commands of the control device 104 in the present embodiment relates to a single spatial target 106.

Turning again to FIG. 4, the system 100 may include a dedicated control device 104 that is a long slender device having a touchscreen 107. The control device 104 includes location patterning by receiving signals from a multitude of fixed transmitters located around the room 166 or space.

The control device 104 has two antenna arrays 172 located at opposite ends of the control device 104. The long slender shape provides distance between the arrays 172. The long slender shape may also keep the user's hand grip in a position that helps minimize interference of the antenna arrays 172. The antenna arrays 172 are constructed of a multitude of directionally sensitive antennas 172 that are targeted in a plurality of different directions. During calibration, a database 156 is set up to record the signal strength of the different antennas on the two antenna arrays 172. The control device 104 matches the radio frequency signature at different locations from multiple transmitters to that of the calibration to determine the position and orientation of the control device 104.

The control device 104 may include a magnetometer 158 for adding another signature to the database 158 to increase accuracy of pattern mapping. During calibration, the control device 104 may not have to be oriented in all different positions. The two separated directional antenna arrays 172 may provide orientation data that is determined and inferred from the calibration data. Further, an accelerometer 144 may determine the orientation in the up/down plane which may more accurately determine orientation and improve calibration.

In an embodiment, the control device 104 includes a fixed home charging base that fixes the position and orientation of the control device 104. The fixed home charging base may improve calibration and recalibration by providing a known location. The control device 104 may include dead reckoning from the fixed home charging base for calibration and recalibration. The fixed home charging base may include a transmitter to work with other reference devices 122 for location tracking.

The control device 104 includes a calibration process that prompts the user to move the control device 104 from one transmitter to the next and so on. The control device 104 uses dead reckoning and identifies the fixed locations on a 3D map with corresponding radiofrequency signatures from the two different arrays 172. The 3D map can be completed using the targeted device 102 and dead reckoning from the known reference of radiofrequency signatures as well as other relevant signatures.

The user may decide to do a longer calibration or a shorter calibration while relying on the targeted device 102 filling in the 3D map through usage. The system 100 may be calibrated to setup the spatial targets 106 as described in the previous example using multiple target lines. The system 100 may also prompt the user to place the control device 104 at the position for the center of the spatial target 106. The user builds the 3D map of radiofrequency signatures on the control device 104 by bringing the handheld remote to new locations in the setup process. Multiple steps in the setup process for each spatial target 106 may not be needed. The spatial target 106 may be placed in front of the targeted device 102 as the control device 104 cannot be placed inside the targeted device 102. The operation of the targeted device 102 is similar as described in the previous embodiment. Since the control device 104 is a dedicated device a specific application does not need to be launched.

The signal transmitters in fixed locations may also have communication abilities so that the signal transmitters are not constantly active. The accelerometer 144 in the control device 104 may be constantly active or in a low power mode that allows the transmitters to be activated when the control device 104 is moved. When the control device 104 is picked up or interacted with, the control device 104 communicates with and wakes up the transmitters from the low power mode.

A different usage scenario will be described with this implementation to show some breadth of the different possible scenarios. These scenarios and their elements are interchangeable with the different possible technology implementations.

In a specific embodiment, the control device 104 is setup for use in a bedroom and the charging base is mounted on a bedroom wall above a bedside table. The control device 104 is accessible from the charging base at the bed or near the bedroom door. The control device 104 is configured to operate the television 102*a* and cable box 102*b* in the bedroom with spatial targets 106 as described above. In addition the control device 104 is setup to control the lighting in the home, the doors and the alarm system. The communication commands originate directly from the control device 104.

The user has set up a spatial target 106 at the corner of the bedroom where two walls and the celling meet to control the doors and the alarm system. There are multiple spatial targets 106 at each pot light in the ceiling to control the lighting.

When the user interacts with the bedroom lighting, the control device 104 may also provide control of other lighting throughout the house. The control device 104 may display the status of the lighting outside of the bedroom. The default context is for the control device 104 to control the lighting associated with the bedroom.

For example, the user is in bed and points the control device 104 at one of the pot lights. The control device 104 displays "bedroom lighting" in the title bar on the touchscreen 107 with controls. The user selects "off" in the controls and the lights in the bedroom turn off.

The controls include a set of primary controls and a set of secondary controls below the primary controls. The secondary controls display other lighting zones in the house with their status. The control device 104 displays that there are lights on in the basement and the control device 104 can activate those controls to turn the basement lights off.

When the user points the control device 104 at the spatial target 106 for the doors and alarm system, the front door may be locked and the alarm may be set.

When the control device 104 is removed from the bedroom, the control device 104 interacts with other transmitters located in other rooms. Where the control device 104 interacts with spatial targets 106 in other rooms related to lighting then the default context of those spatial targets 106 are configured to be assigned to those rooms.

A further example implementation is a simpler system that is setup for use in a larger space such as a warehouse. A plurality or workers in the warehouse each have a mobile handheld computer that interacts with the Wi-Fi system in the warehouse. These mobile handheld computers are the control device 104.

The control device 104 includes the touchscreen 107 and physical controls of a navigation pad and keypad. Internally the control device 104 includes a processor and memory, Wi-Fi communication abilities, an accelerometer 144 and a magnetometer 158. The network of reference devices 122 in this scenario are the Wi-Fi access points located throughout the warehouse. The control device 104 uses location patterning with its Wi-Fi receiver and magnetometer 158 to locate each control device 104 through Wi-Fi signal strength signature and magnetometer 158 signature.

In this embodiment, the control device 104 does not include a gyrometer for dead reckoning and the control device 104 does not have the same receiver signal data as with multiple directional antenna arrays. The positioning may be less accurate and the spatial targets 106 are much larger and spaced further apart to allow for the accuracy tolerances inherent in the system 100.

The targeted device 102 is located relatively by the signal strength the targeted device 104 receives from different Wi-Fi access points. The magnetometer 158 determines an approximate orientation of the control device 104 in the relative NESW plane. The accelerometer 144 determines the control device 104 orientation in the up/down plane.

The height above the ground of the control device 104 is not determined from sensors. Therefore the control device 104 is assumed to be at a predetermined distance from the ground (e.g., 4 feet). A dedicated machine that is rolled on a cart with the sensors at the predetermined distance from the ground uses location patterning of the Wi-Fi signal strengths from different access point and the magnetometer 158 readings to create a signal mapping of the space that the control devices 104 can reference for position and orientation data.

The power output of different access points may be adjusted to improve the distinctiveness of the radiofrequency signature in different areas. To improve the relative NESW plane orientation sensing of the control device 104, electromagnets may be added in areas near where the magnetometer 158 does not pick up a distinct consistent signal.

The mapping data of the radiofrequency signatures is stored in the network. The mapping data may be updated frequently and may also learn and be improved by the data gathered as the system 100 is being used.

Applications for the warehouse examples may be different than traditional office or home uses. The warehouse embodiment may be used to access inventory information or order applications with warehouse location context. Once a particular use is being activated, the spatial target 106 may be moved without losing the application context. As well, the warehouse may include devices (e.g., a forklift) that have their location tracked in the network. The forklift represents a moving spatial target 106. Where the control device 104 is pointed at the forklift spatial target 106, the control device 104 displays the order that the forklift is fulfilling on the touchscreen 107.

Figure 8:
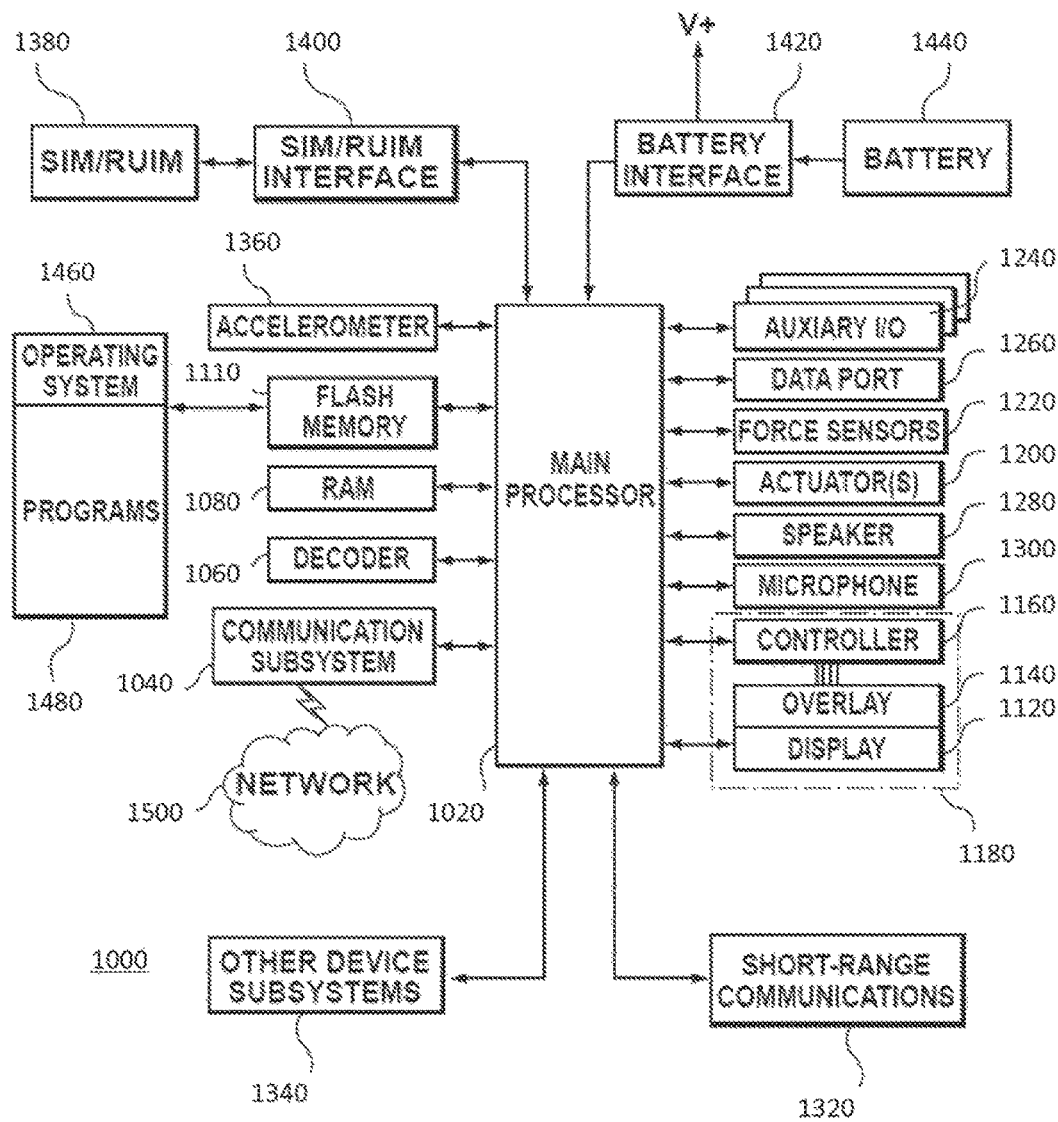
FIG. 8 is a perspective view of a system for controlling a targeted device with a control device, in accordance with an embodiment.

FIG. 8 shows a simplified block diagram of components of a portable electronic device 1000 (such as control device 104). The portable electronic device 1000 includes multiple components such as a processor 1020 (such as processor 114) that controls the operations of the portable electronic device 1000. Communication functions, including data communications, voice communications, or both may be performed through a communication subsystem 1040. Data received by the portable electronic device 1000 may be decompressed and decrypted by a decoder 1060. The communication subsystem 1040 may receive messages from and send messages to a wireless network 1500.

The wireless network 1500 may be any type of wireless network 1500, including, but not limited to, data-centric wireless networks, voice-centric wireless networks, and dual-mode networks that support both voice and data communications.

The portable electronic device 1000 may be a battery-powered device and as shown includes a battery interface 1420 for receiving one or more rechargeable batteries 1440.

The processor 1020 also interacts with additional subsystems such as a Random Access Memory (RAM) 1080, a flash memory 1100, a display 1120 (such as display 109 or touchscreen 107) (e.g. with a touch-sensitive overlay 1140 connected to an electronic controller 1160 that together comprise a touch-sensitive display 1180), an actuator assembly 1200, one or more optional force sensors 1220, an auxiliary input/output (I/O) subsystem 1240, a data port 1260, a speaker 1280, a microphone 1300, short-range communications systems 1320 and other device subsystems 1340.

In some embodiments, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a portable electronic device 1000 generated by the processor may be displayed on the touchscreen 107.

The processor 1020 may also interact with an accelerometer 1360 (such as accelerometer 144). The accelerometer 1360 may be utilized for detecting direction of gravitational forces or gravity-induced reaction forces.

To identify a subscriber for network access according to the present embodiment, the portable electronic device 1000 may use a Subscriber Identity Module or a Removable User Identity Module (SIM/RUIM) card 1380 inserted into a SIM/RUIM interface 1400 for communication with a network (such as the wireless network 1500). Alternatively, user identification information may be programmed into the flash memory 1100 or performed using other techniques.

The portable electronic device 1000 also includes an operating system 1460 and software components 1480 that are executed by the processor 1020 and which may be stored in a persistent data storage device such as the flash memory 1100. Additional applications may be loaded onto the portable electronic device 1000 through the wireless network 1500, the auxiliary I/O subsystem 1240, the data port 1280, the short-range communications subsystem 1320, or any other suitable device subsystem 1340.

In use, a received signal such as a text message, an e-mail message, web page download, or other data may be processed by the communication subsystem 1040 and input to the processor 1020. The processor 1020 then processes the received signal for output to the display 1120 or alternatively to the auxiliary I/O subsystem 1240. A subscriber may also compose data items, such as e-mail messages, for example, which may be transmitted over the wireless network 1500 through the communication subsystem 1040.

For voice communications, the overall operation of the portable electronic device 1000 may be similar. The speaker 1280 may output audible information converted from electrical signals, and the microphone 1300 may convert audible information into electrical signals for processing.

What has been described and illustrated herein is a preferred embodiment of the disclosure along with some of its variations. The terms, descriptions and figures used herein are set forth by way of illustration only and are not meant as limitations. Those skilled in the art will recognize that many variations are possible within the spirit and scope of the disclosure in which all terms are meant in their broadest, reasonable sense unless otherwise indicated. Any headings utilized within the description are for convenience only and have no legal or limiting effect.

While the above description provides examples of one or more apparatus, methods, or systems, it will be appreciated that other apparatus, methods, or systems may be within the scope of the claims as interpreted by one of skill in the art.

The invention claimed is:

1. A control device for controlling a plurality of targeted devices, the control device comprising: orientation and direction sensors for measuring orientation and direction of the control device relative to the environment;
   a device location tracking system for determining the location of the control device relative to at least one reference device;
   a database for storing location data of spatial targets for the target devices;
   a processor for determining if the control device is pointed at the spatial target based on the location data of the spatial target and the orientation, direction, and location of the control device, wherein the processor includes a setup process to create the spatial target for each target device; and
   an input mechanism for receiving control instructions for controlling the targeted device,
   wherein the spatial target includes a priority ranking to remove ambiguity as to what spatial target is being targeted, wherein the priority ranking is based on any one or more of proximity, user preselection, frequency of control of the targeted device, and recency of control of the targeted device, and
   wherein the spatial target is determined from:
     the intersection of at least two target lines;
     a point halfway between the shortest distance between the two target lines; or
     locating the control device at or near a desired spatial target location.

2. The control device of claim 1, wherein the direction sensor is an accelerometer for measuring the direction of the control device in an updown plane.

3. The control device of claim 1, wherein the orientation sensor is a magnetometer for measuring the orientation of the control device in a North-East-South-West plane.

4. The control device of claim 1, wherein the orientation sensor is an antenna array or a camera for determining the orientation of the control device relative to the reference device.

5. The control device of claim 1, wherein the reference device includes at least one camera configured to capture a tracking target displayed on the control device to determine the location of the control device.

6. The control device of claim 1, wherein the spatial target is located on or near the targeted device and the control device controls the target device that is associated with the closest spatial target that the control device is pointed at.

7. The control device of claim 1, wherein the device location tracking system determines the location of the control device by triangulating signals transmitted from at least three reference devices.

8. A method for controlling a plurality of targeted devices, the method comprising:
   measuring orientation and direction of a control device relative to the environment;
   determining the location of the control device relative to at least one reference device;
   providing a setup process including creating a spatial target for each target device;
   storing location data of spatial targets for the target devices;
   determining if the control device is pointed at the spatial target based on the location data of the spatial target and the orientation, direction, and location of the control device;
   receiving control instructions for controlling the targeted device; and
   performing a priority ranking to remove ambiguity as to what spatial target is being targeted, wherein the priority ranking is based on any one or more of proximity, user preselection, frequency of control of the targeted device, and recency of control of the targeted device,
   wherein the spatial target is determined from:
     the intersection of at least two target lines;
     a point halfway between the shortest distance between the two target lines, or
     locating the control device at or near a desired spatial target location.

9. The method of claim 8 further comprising measuring the direction of the control device relative to a horizontal plane.

10. The method of claim 9 further comprising measuring the orientation of the control device in the horizontal plane.

11. The method of claim 8 further comprising measuring orientation from two antenna arrays located at opposite ends of the control device.

12. The method of claim 8 further comprising capturing a tracking target displayed on the control device to determine the location of the control device.

13. The method of claim 8, wherein the spatial target is located on or near the targeted device and the control device controls the target device that is associated with the closest spatial target that the control device is pointed at.

14. The method of claim 8 further comprising determining the location of the control device by triangulating signals transmitted from at least three reference devices.

* * * * *